United States Patent [19]
Brueck et al.

[11] Patent Number: 5,426,498
[45] Date of Patent: Jun. 20, 1995

[54] METHOD AND APPARATUS FOR REAL-TIME SPECKLE INTERFEROMETRY FOR STRAIN OR DISPLACEMENT OF AN OBJECT SURFACE

[75] Inventors: Steven R. J. Brueck; David B. Burckel; Andrew Frauenglass; Saleem Zaidi, all of Albuquerque, N. Mex.

[73] Assignee: University of New Mexico, Albuquerque, N. Mex.

[21] Appl. No.: 223,091

[22] Filed: Apr. 4, 1994

[51] Int. Cl.$^6$ ............................................. G01L 1/24
[52] U.S. Cl. ................................. 356/35.5; 356/357; 73/800
[58] Field of Search ................. 356/35.5, 357, 345, 356/358; 73/800, 655, 656

[56] References Cited

U.S. PATENT DOCUMENTS

| | | | |
|---|---|---|---|
| 4,322,162 | 3/1982 | McKelvie et al. | 356/35.5 |
| 5,061,860 | 10/1991 | Takemori | 356/376 |

OTHER PUBLICATIONS

R. Dändliker et al; Measuring Microvibrations by Heterodyne Speckle interferometry; Dec. 4, 1980; pp. 165–167.

Laser Speckle and Related Phenomena; 1975; pp. 1–7; Dainty, J. C.
Speckel Metrology; 1993; Sirohi, R.; pp. V–IX.
Donald E. Duffy; Moire Gauging of In Plane Displacement Using Double Aperature Imaging; Aug. 1972; pp. 1778–1781.
Rene Dändliker; Heterodyne Holographic Interferometry; 1980; pp. 3–84, Book Author Wolf, E., Progress In Optics XVII.

*Primary Examiner*—Samuel A. Turner
*Assistant Examiner*—Jason D. Eisenberg
*Attorney, Agent, or Firm*—Albert Sopp; Robert Becker

[57] ABSTRACT

A displacement measuring method and device is disclosed in which speckle amplitude interferometry within a single speckle feature or a small number of features of a speckle pattern is used to achieve sub-fringe accuracy with a single detector and to measure displacement of the object under investigation with sub-wavelength accuracy at measurement speeds consistent with real-time control of manufacturing processes. The same technique applied to multiple spots on a sample with optical means for causing interference between different combinations of scattered fields, including fields from different illuminated spots, permits measurements of the total sample motion.

6 Claims, 7 Drawing Sheets

METHOD AND APPARATUS FOR REAL-TIME SPECKLE INTERFEROMETRY FOR STRAIN OR DISPLACEMENT OF AN OBJECT SURFACE

GOVERNMENT RIGHTS

Support for the work leading to this invention was provided by the U.S. Government, which has certain rights therein.

BACKGROUND OF THE INVENTION

Speckle is the seemingly random intensity distribution observed when illuminating a rough surface (on a scale of the optical wavelength) of an object with a coherent laser beam. The electric field of the scattered light is the superposition of contribution from different portions of the surface, all of which have random relative phases as a result of the surface roughness. In regions where these phases interfere constructively a bright speckle feature is formed, in regions where they interfere destructively a dark feature results. The scale of these features is set by the highest spatial frequency transmitted by the optical system and is inversely proportional to the illuminated area for "objective" speckles (free space propagation, no imaging). Related phenomena are well known in all forms of coherent imaging including radar and sonar. While the initial emphasis was on techniques for reduction of speckle, a large field has emerged over the past twenty years in using speckle effects for metrology applications. A good review of the field is *Laser Speckle and Related Phenomena*, J. C. Dainty, ed. (Springer-Verlag, Berlin, 1984). A more recent reference is *Speckle Metrology*, Rajpal S. Sirohi, ed. (Marcel Dekker, New York, 1993).

The large majority of speckle measurements are based on imaging intensity correlation techniques, e.g. photography or electronic imaging, and correlating multiple images to monitor wavelength scale surface changes (U.S. Pat. No. 5,061,860 for example). A significant disadvantage of these techniques is that the processing time (developing a photographic plate, storing and manipulating the large numbers of pixels in CCD camera images) makes speckle techniques unsuitable for applications in which real-time information is needed, for example process control in semiconductor manufacturing. Further, typical techniques involve averaging over a large number of speckles which again increases the signal processing time required and reduces the measurement precision. A notable exception to these full frame techniques is the heterodyne speckle interferometry approach introduced by Dändeliker [R. Dändeliker and J. F. Willemin, Measuring Microvibrations by Heterodyne Speckle Interferometry, Opt. Lett. 6, 165 (1980); R. Dändeliker, Heterodyne Holographic Interferometry, in Progress in Optics XVII, pp. 1–84, E. Wolf, ed. (north-Holland, Amsterdam, 1980)].

Various geometries have been developed with sensitivity to different aspects of surface motion. One frequently used geometry, first described by Leendertz [Interferometric Displacement Measurements on Scattering Surfaces Utilizing Speckle Effects, J. Phys. E (Sci. Instrum.) 3, 214 (1970)], and sensitive only to in-plane displacements is shown in FIG. 1. Two coherent beams A and B are incident on the wafer C from opposite sides at angle $\theta_i$. The corresponding speckle patterns F are taken normal to the surface. The electric field of the speckle pattern arising from the right-hand beam B is given by:

$$A_r(\vec{r}) e^{ik\psi_r(\vec{r})} \qquad (1)$$

where $A_r$ and $\psi_r$ are random variables as a function of position, r, in the detection plane. A similar expression holds for the speckle pattern arising from the beam incident from the left. The total intensity is given by:

$$I = |A_r|^2 + |A_l|^2 + 2|A_r||A_l|\cos(\psi_r - \psi_l) \qquad (2)$$

where, because of the coherent phase addition of the light originating from different points on the sample, $A_r$, $A_l$, $\psi_r$, $\psi_l$ are all random functions of position in the detection plane (r). The statistics of these random functions are such that the total intensity is also a random functions with the same statistics as each of the individual speckle patterns.

Now consider translation of the wafer 9 to the right in FIG. 1) by a distance $\Delta x$. The overall phase of the fields associated with the right speckle pattern is decreased by $k\Delta x \sin\theta_i$ while that of the fields associated with the left speckle pattern is increased by the same amount, that is:

$$\psi_r \to \psi_r - k\Delta x \sin\theta_i$$

$$\psi_l \to \psi_l + k\Delta x \sin\theta_i \qquad (3)$$

$$I \to |A_r|^2 + |A_l|^2 + 2|A_r||A_l|\cos(\psi_r - \psi_l - 2k\Delta x \sin\theta_i)$$

The intensity is a periodic function in $\Delta x$ with period $\lambda/(2\sin\theta_i)$. The periodicity is the basis of in-plane speckle metrology techniques. For this geometry, out-of-plane motion (up to down in the figure) changes both phases by the same amount and the argument of the cosine function is insensitive to out-of-plane displacement.

FIG. 2 shows typical speckle fringes obtained in measuring the temperature of a Si wafer using the in-plane measurement geometry of FIG. 1. The measurements were carried out by electronic pattern speckle interferometry (ESPI). A first speckle image (A) was stored via a CCD camera and a computer at the initial temperature. The temperature was then increased and a second speckle image stored (B) electronically and subtracted (A-B) from the first. The dark bands correspond to regions where $\Delta x(x_o) = m\lambda/(2\sin\theta_i)$, with m an integer, where the two speckle patterns are almost identical. Here, $x_o$ refers to the position on the wafer and $\Delta x(x_o)$ the local displacement of that position as a result of the heating. The bright bands are intermediate to these values where there is a lower correlation between the speckles. The temperature resolution in this arrangement is set by the requirement that the width of the area illuminated by the incident laser beams, L, is large enough for a fringe to appear; i.e. that $$L > \frac{\lambda}{2\alpha\Delta T \sin\theta_i}.$$

FIG. 2 shows a sequence of three such speckle intensity correlation patterns for increasing temperatures. Several of the difficulties with speckle interferometry are apparent from this figure. First, the time required to manipulate the frames is considerable. Nearly ½ million pixels are involved for each full TV image at a 600×800 resolution. Secondly, contrast of the fringes is not high.

(This can be improved somewhat with phase shifting techniques involving still more speckle frames and computer manipulation). Furthermore, the randomness of the speckle patterns makes determining fractional fringe counts problematic, restricting the measurement precision. Speckle correlation is also lost over large temperature ranges as the system motion results in uncorrelated speckle patterns, or as the fringe spacing get comparable to a speckle dimension d set by the optical system ($d \approx \lambda f/a$ where f is the lens focal length and a the aperture diameter.

SUMMARY OF THE INVENTION

An object of the present invention is to eliminate the above described difficulties associated with displacement and strain measurements carried out using conventional speckle interferometry. Specifically, the present invention relates to a new speckle technique which takes advantage of amplitude interferometry within a single feature or a small number of features of a speckle pattern to achieve sub-fringe accuracy using only a single, or a small number of, detector(s). This is in contrast to the conventional use of intensity correlation with multiple, spatially resolved detection elements (pixels). With this technique, displacement of the object under investigation is measuring method and device, a single beam is focused onto the object at normal incidence. Light scattered from the illuminated surface is collected in two directions symmetrically distributed about the surface normal and standard optics (mirror and beamsplitter) are used to combine the two patterns. Because of differing optical path lengths and the approximately spherical wave character of the scattered light, the amplitude interference between the optical fields scattered into the two directions gives rise to a set of fringes known as Newton's rings. The fringe spacing can be adjusted independently of the speckle size and for fringes small compared with a speckle feature, the patterns are very smooth as compared to conventional speckle fringes. A single detector placed, for example within the central disk of the Newton's rings provides a real-time fringe counting capability that is much more precise than traditional speckle intensity correlation fringes that involve averaging over large numbers of speckle features. The amount of deformation of the object is determined from the cumulative change in phase of the Newton's rings interference pattern at a fixed point in the pattern rather than from the change in period of the speckle intensity cross-correlation pattern as is conventionally measured. Additional embodiments of this invention include the illumination of multiple spots on a sample, and optical means for causing interference between different combinations of scattered fields, including fields from different illuminated spots. A wide array of geometries, sensitive to different aspects of sample displacement, e.g. in-plane, out-of-plane, tilt, strain, etc., is possible.

The invention has many potential applications. For example, this invention provides a non-contact means for accurately measuring the temperature of Si wafers is semiconductor manufacturing processes where the expansion of the wafer during heating is measured and related to the temperature by the known thermal expansion coefficient. This is a rapid thermal processing application where precisions on the order of $\pm 1°$ C. and times on the order of 0.03 seconds are required and obtainable using this technique.

BRIEF DESCRIPTION OF THE DRAWINGS

These and other features, aspects, and advantages of the present invention will become better understood with regard to the following description, appended claims, and accompanying drawings where:

DESCRIPTION OF PREFERRED EMBODIMENTS

Figure 3:
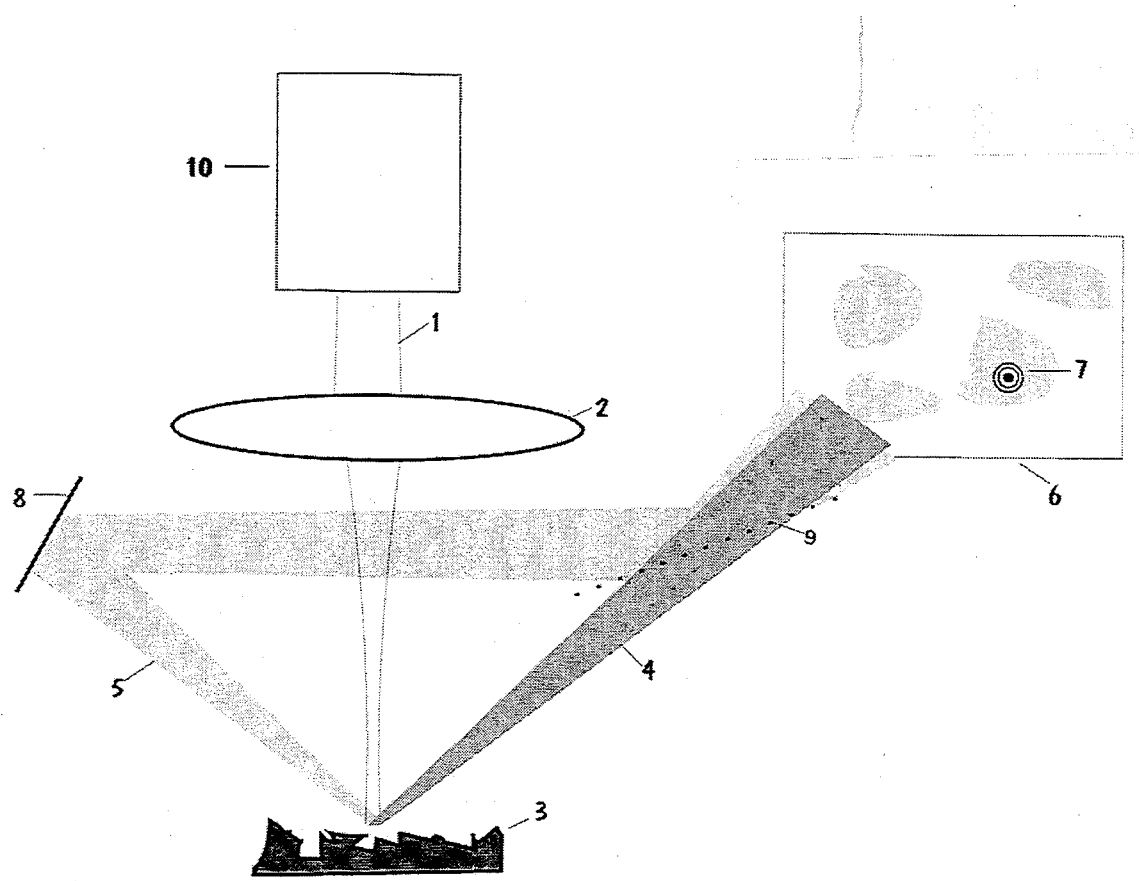
FIG. 3 shows the optical setup for one embodiment of the present invention.

The new technique that we have developed is based on an inversion of the traditional speckle technique. FIG. 3 shows the basic optical setup that illustrates the method and apparatus of the present invention in which displacement of the object is measured. The use of two such optical setups permit a direct measurement of strain, or thermal expansion, for the object under investigation as will be subsequently be discussed with reference to FIG. 5. Three such optical setups can be used to measure the deformation of the object while eliminating the error inducing effects of displacement and tilt of the object.

In FIG. 3, a single laser beam 1 from a laser source 10 is focused by lens 2 onto the wafer surface 3 at normal incidence. The speckle is collected in two directions symmetrically distributed about the surface normal using standard optics. Here, a mirror 8 reflects one speckle beam 5 toward the other speckle beam 4. Beamsplitter 9 is arranged so that the propagation directions of beams 4 and 5 are matched such that an interference pattern 7 is created when the two speckle beams are detected with a square-law device such as the screen 6 shown schematically in the Figure. The intensity in the detection plane can be written as an extension of Eq. 2 as:

$$I(r,x_0) = A_r(\vec{r}) + A_l(\vec{r}) + \qquad (4)$$

$$2|A_r(\vec{r})||A_l(\vec{r})|\cos\left[\psi_r(\vec{r},x_0)\left(1+\frac{k\rho^2}{2R_r}\right)-\psi_l(\vec{r},x_0)\left(1+\frac{k\rho^2}{2R_l}\right)\right]$$

with $\psi_r(r,x_0) = \psi_{r0}(r) - k\Delta x_0 \sin\theta$ and $\psi_l(r,x_0) = \psi_{l0}(r) + k\Delta x_0 \sin\theta$. Here $\rho$ is the radial distance in the detection plane and $R_r$ ($R_l$) are the propagation distances from the illuminated spot to the detection plane for the right and left beams, respectively. This equation assumes that the detection plane is in the Fraunhofer (radiation zone) regime ($\lambda R/a^2 >> \rho^2 >> 1$) with respect to both the size of the laser illuminated spot (linear dimension a) and the size of the detected (linear dimension ρ) spots. The traditional speckle information is contained in the phases which along with the amplitudes $A_r$ and $A_l$ are random functions of position in the detection plane. The scale of a speckle feature is set by the optical system and is $$\Delta r_{speckle} \approx \lambda R_{avg}/a, \qquad \ldots (5)$$

where $R_{avg}=(R_r+R_l)/2$, while that of the interference fringes due to the differing propagation distances is (from Eq. 3)

$$\Delta r_{fringe} \sim \sqrt{\frac{\lambda}{2}\left(\frac{1}{R_r}-\frac{1}{R_l}\right)^{-1}} \qquad (6)$$

Figure 4:
FIG. 4 contains a sample of concentric fringes obtained using the method and optical setup depicted in FIG. 3.

Importantly, the optical system provides independent control over both of these scale lengths. For $\Delta r_{fringe} >> \Delta r_{speckle}$, the interference fringes are not observable because of the random variations associated with the speckle pattern. Nevertheless, the intensity of each speckle feature will vary with displacement with a period $\Delta x_0 = \lambda/2\sin\theta$. For $\Delta r_{speckle}$ Newton's rings fringes, resulting from the interference of two spherical waves with different radii of curvature, are clearly observed within an individual speckle feature. The interference pattern 7 thus created is similar to that shown in FIG. 4. This geometry provides the same symmetry as the traditional geometry of FIG. 1, restricting the sensitivity to in-plane motion along a line between the centerlines of the two collection apertures. FIG. 4 shows an example of the rings observed with a CCD camera (in place of the screen 6) behind the beamsplitter 9 of FIG. 3. Since the fringe spacings are very small compared with the speckle size for this image, the patterns are very smooth as compared with conventional speckle fringes. Placing a single detector in the central fringe, or a linear detector array across this image, provides a real-time fringe counting capability that is much more accurate than traditional speckle intensity correlation fringes. The fringes do not change location with displacement, rather the intensity at a given point, for example in the center disk of an individual speckle feature, varies sinusoidally with a period of $\lambda/2\sin\theta$ as the wafer surface is displaced. The displacement of the wafer surface in the plane of the speckle beams can then be directly related to the number (and fractional part) of fringe cycles that are counted during the displacement. The technique, and the achievable resolution, are very comparable to conventional interferometry with resolutions of about $\lambda/1000$.

Figure 1:
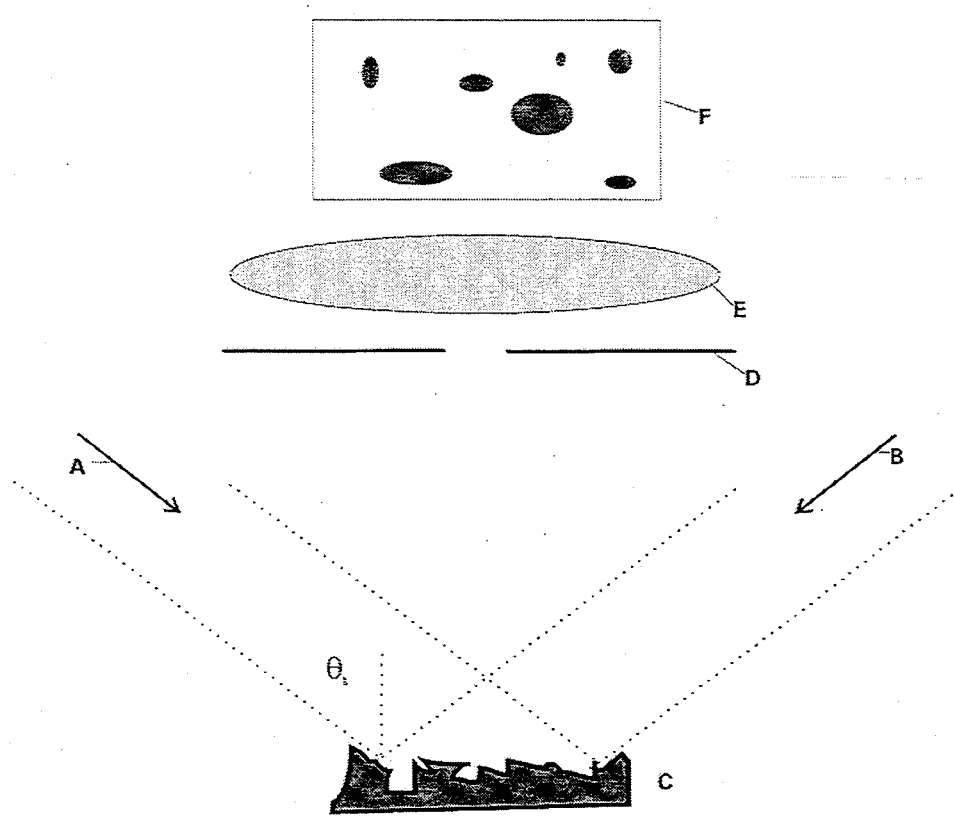
FIG. 1 shows the traditional (prior art) geometry for speckle measurement of in-plane displacement.
Figure 2:
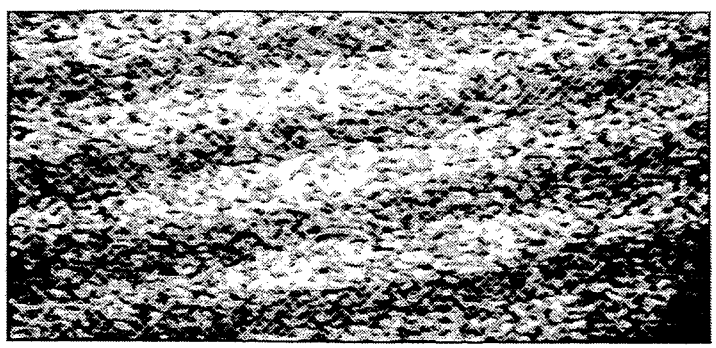
FIG. 2 shows typical speckle fringes obtained in measuring the temperature of a Si wafer using the method and device of prior art FIG. 1.
Figure 2:
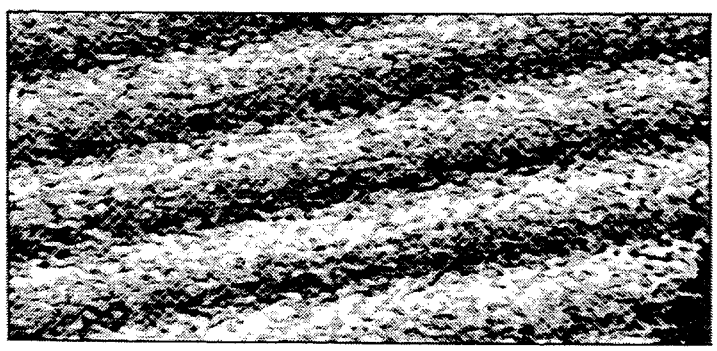

In the traditional prior art geometry of FIG. 1, the two radii are nominally equal, and $\Delta r_{fringe} >> \Delta r_{speckle}$. The intensity of each speckle feature is a cosinusoidal function of the wafer position. In the configuration of FIG. 3, the path lengths can be arranged so that $\Delta r_{fringe} < \Delta r_{speckle}$ and the relatively homogeneous Newton's ring fringes of GI. 4 are obtained. The intensity within each ring of the pattern is now a cosinusoidal function of wafer position. Finally, if the path lengths are changed such that $\Delta r_{fringe} > \Delta r_{speckle}$ and further, $\Delta r_{fringe} << D$ where D is the detector diameter, the detector averages over many fringes and the displacement information is lost.

Figure 5:
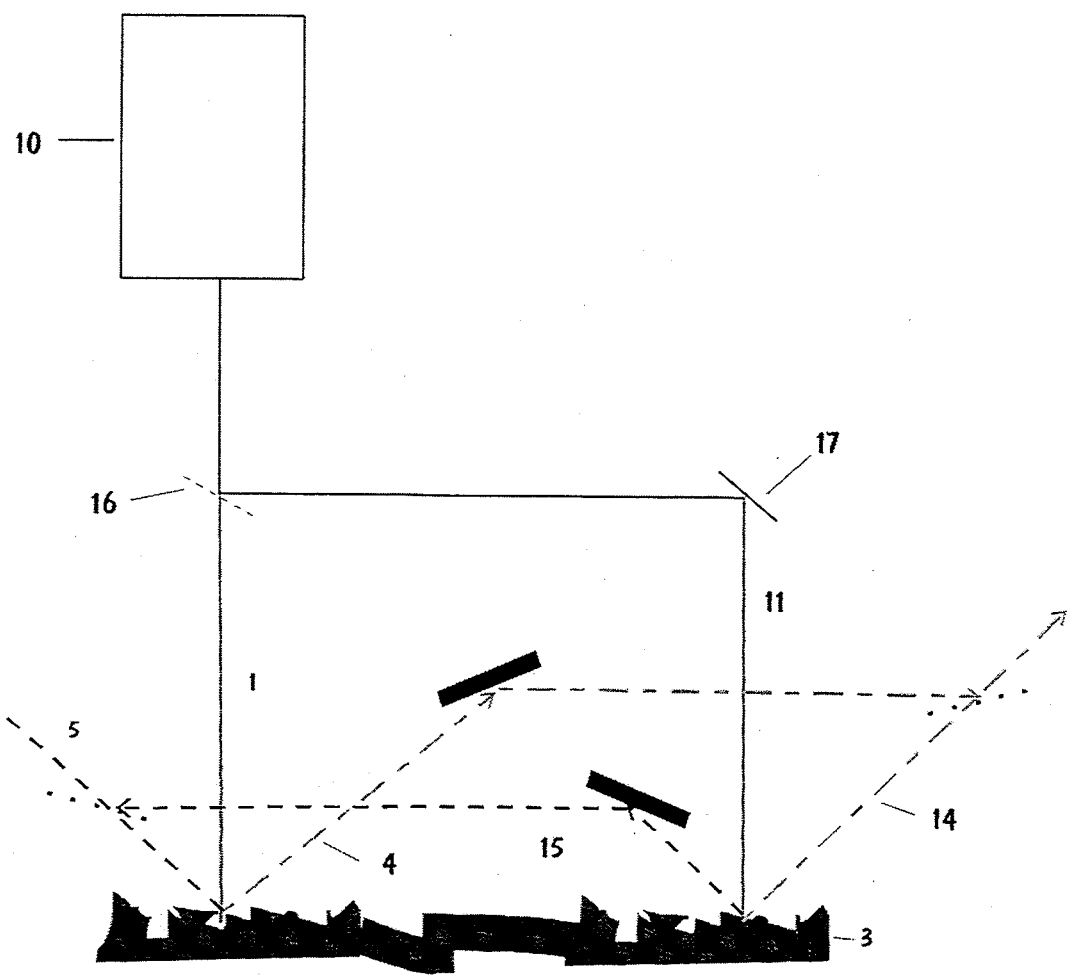
FIG. 5 shows the speckle interference geometry for strain measurement according to the present invention.

Temperature is proportional to the strain through thermal expansion. This can be monitored by repeating the measurement at a second position and subtracting the displacements to get the differential displacement or strain. Alternatively, the optics can be adjusted to cause the speckle at the same angles from the two spots to interfere, as illustrated in FIG. 5. Here a second input beam 11 is introduced a distance L to the right of the first beam and the optics are arranged to interfere two right going (4 and 14) and two left going (5 and 15) scattered beams. The displacements of the two illuminated areas are described by a rigid body translation, X, an expansion, $\alpha L\Delta T$, and a tilt (rotation through an angle $\gamma$ about the y-axis in the plane of the sample and perpendicular to the line between the two illuminated areas). It is straightforward to show the translation in the other two directions (y and z—out-of-plane of the wafer) and rotation about the x and z axes affects all of the phases identically and, therefore, cancels out of the interference pattern. Then, as a function of the wafer motions, the phased associated with each arm are:

$$\psi_r^1 = \psi_{r0}^1 - kX\sin\theta + kL/2\{2\sin(\gamma/2)\cos(\theta-\gamma/2) - \alpha\Delta T\sin(\theta-65)\},$$
$$\psi_r^2 = \psi_{r0}^2 - kX\sin\theta + kL/2\{-2\sin(\gamma/2)\cos(\theta-\gamma/2) - \alpha\Delta T\sin(\theta-65)\},$$
$$\psi_l^1 = \psi_{l0}^1 + kX\sin\theta + kL/2\{2\sin(\gamma/2)\cos(\theta+\gamma/2) + \alpha\Delta T\sin(\theta+65)\}, \text{ and}$$
$$\psi_l^2 = \psi_{l0}^2 + kX\sin\theta + kL/2\{-2\sin(\gamma/2)\cos(\theta-\gamma/2) - \alpha\Delta T\sin(\theta+65)\}. \qquad (7)$$

From this it follows that the phase differences in the arguments of the respective cosine functions are:

$$\psi_r = \psi_{r0}^{1-2} + kL\{2\sin(\gamma/2)\cos(\theta+\gamma/2) + \alpha\Delta T\sin(\theta+\gamma)\}, \text{ and}$$
$$\psi_l = \psi_{l0}^{1-2} + kL\{2\sin(\gamma/2)\cos(\theta-\gamma/2) - \alpha\Delta T\sin(\theta-\gamma)\} \qquad (8)$$

Notice that the rigid body translation, X, does not appear in Eq. (8). Finally, combining the two phase terms gives $$\psi_r - \psi_l = \psi_0 + 2kL\{2\sin(2\theta)\sin^2(\gamma/2) - \alpha\Delta T\sin\theta\cos\lambda\} \qquad (9)$$

which has the required dependence on $\Delta T$, is independent of translation and only weakly dependent on rotation (order $\gamma^2$). A more accurate expression will allow for the temperature dependence of $\alpha$. It is important to note that, in contrast to the conventional speckle intensity correlation technique, L is now the distance between the two spots rather than the illuminated width. The spot sizes may be much smaller than L; giving much more intense speckle features for the same laser power.

The intensity and phase of the interference pattern are random variables that are uncorrelated over different speckle features. Thus for a precise measurement, it is best to restrict a measurement to a single speckle feature. This requires that the sample motion be much less than the speckle intensity correlation techniques described in connection with FIG. 1. If the sample moves so much that the speckles are shifted by more than a speckle dimension, correlation is lost in the intensity case, and a random phase shift is introduced in the present experiment. The tighter the focus used, the more sever this constraint.

Figure 5A:
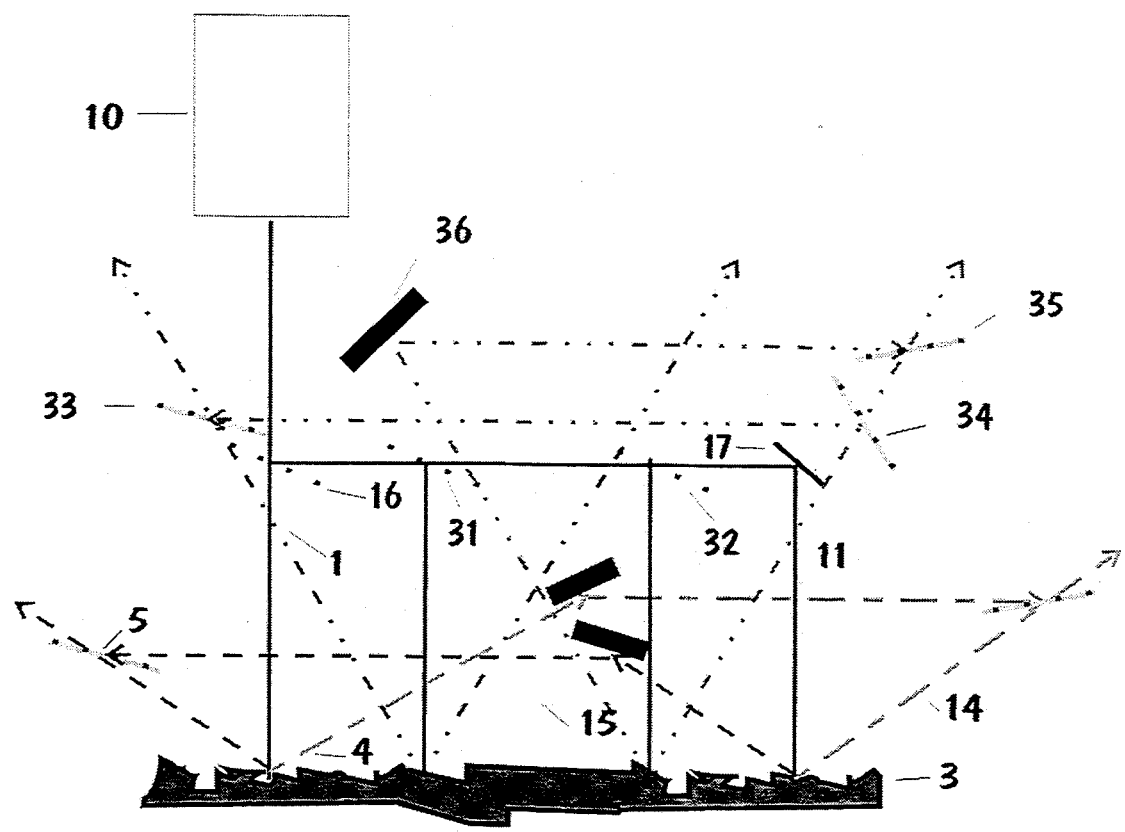
FIG. 5A shows an embodiment wherein multiple laser spots illuminate an object to produce multiple interfering speckle combinations.

Additional detectors can be used to monitor individual point speckle interferences as in FIG. 3. Combining all of this information gives additional insight into the wafer motion under heating. Additional points of the wafer can be investigated. In principle, for n points there are $2n(2n-1)/2$ independent pairs of scattered beams and 2n+3 unknown (2n arbitrary phases and three wafer displacement unknowns, X, $\gamma$, and $\Delta T$). For two points this gives six independent combinations and seven unknowns. For three points along a line, there are 15 independent combinations with only 9 unknowns so that it is possible to uniquely evaluate the phases $\psi_{r0}{}^i$ and $\psi_{l0}{}^i$ as well as more complex wafer distortions such as inhomogeneous heating and bowing. The possibility of monitoring the random phases eliminates the restriction to wafer motions less than the illumination spot size since the random changes in phase can be tracked. While this adds significant optical complexity, the small numbers of detectors do not introduce any signal processing speed limitations. See FIG. 5A as an example.

Figure 6:
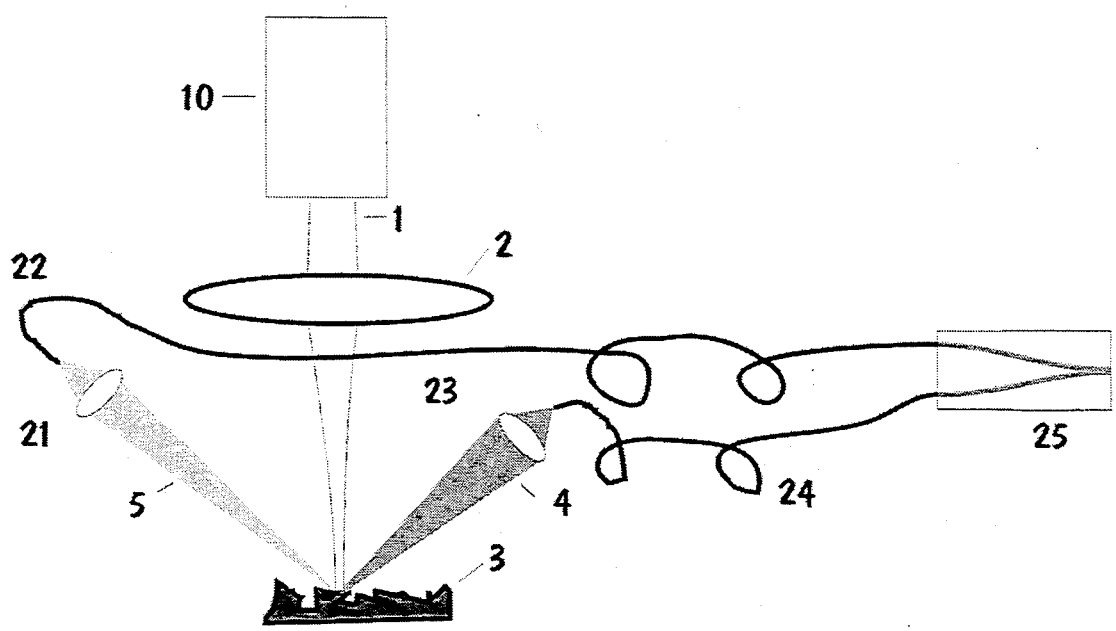
FIG. 6 shows a possible fiber and integrated optical implementation of an embodiment of the present invention.

It is unlikely that free-space beam combining optics with individual mirrors and beamsplitters will be practical for the required large number of combinations. However, a fiber and integrated optical implementation in which all of the beam splitting and combination is lithographically defined is very possible. A fiber implementation also has a major advantage in terms of the required optical access in actual manufacturing equipment. Another significant advantages of a fiber implementation is that a calibration of heating effects on the optical path in the fiber can be readily achieved by injecting light from the detection end of the fibers and monitoring the path length through the entire optical system. An example of a fiber and integrated optical implementation is shown in FIG. 6.

An additional refinement of this general class of measurements include the use of modulators for heterodyne measurements to enhance the interference terms as was first introduced by Dändeliker and to provide selectivity against the large visible radiation load in semiconductor processing equipment such as rapid thermal processors in which visible lamps provide the radiant heating energy.

As one indication that this idea is very different from traditional speckle techniques, we cite the review article by Dändiliker (Progress in Optics, p. 11; referenced above)

"non-vanishing average interference . . . requires that the two random pace distributions . . . are correlated . . . This means that the two rough surfaces have to be microscopically identical and that the same polarization of the scattered light should be selected, since the statistical properties of the light from most kinds of surface roughness are polarization dependent. Moreover, the speckles depend strongly in the observation aperture. It was shown . . . that therefore interference fringes are not visible if two completely different apertures for the observation of the fields are used. This implies for practical applications that only two states of the same solid object with a rough surface under identical illumination, observation and polarization conditions can be compared interferometrically with each other . . . " (emphasis added)

These statement are correct in the context in which they were made, namely, observation of a large number of speckle features. The random phase jumps between features make it impossible to observe a macroscopic fringe pattern based on differences in wafer motion. However, the techniques of the present invention do allow fringes. The fringes are associated with the different wavefront curvatures of the two beams, and there is a coherent relationship between the fringes and the motion of the wafer.

An earlier work by Duffy (D. E. Durry, Moiré Gauging of In-Plane Displacement using Double Aperture Imaging, Appl. Opt. 11, 1778 (1972)) had demonstrated the use of two apertures to collect and interfere, in amplitude, speckle information from the same object at two symmetrically distributed portions of the scattering solid angle. The resulting speckle pattern was modulated by interference fringes associated with the two plane waves corresponding to the propagation direction. Duffy used a photographic plate to record the interference pattern and then monitored sample displacement by monitoring transmission of the speckle pattern through the developed photographic plate (i.e., by intensity correlation techniques). Low contrast moiré fringes are formed by the shift in the fringes, similar to that discussed in this disclosure, modulated by the random speckle intensity pattern. In distinction to the method disclosed herein, this was a full image technique covering many speckle features that resulted in low contrast fringes.

The present invention differs from previous speckle displacement measurements rather than of ways. Importantly, amplitude interference is used for speckle measurements rather than intensity correlation patterns. Symmetric collection geometry is used for in-plane displacement measurements. Different path lengths provide interference fringes between speckle images on a scale independent of the speckle correlation length. Speckle correlation length is enlarged by decreasing the illuminated area rather than by aperturing of the collection lens. This leads to much higher speckle intensities for the same incident power. The correlation of speckle over large lengths (L) by illuminating two isolated areas separated by L and interfering the speckle from both areas gives a direct strain measurement that is insensitive to rigid-body translation. Finally, by taking different combinations of speckle amplitude interference, the total wafer motion can be determined.

The present invention is, of course, in no way restricted to the specific disclosure of the specifications and drawings, but also encompasses any modifications within the scope of the appended claims.

What is claimed is:

1. In metrology, the method of measuring displacement of an object with sub-wavelength accuracy in real-time by interfering speckle beams, comprising the steps of:
    (a) irradiating a spot on an object with a laser beam at normal incidence to obtain speckle, said speckle comprised of random-appearing intensity distribution features;
    (b) collecting the speckle using standard optics in a left and a right direction, said left and right directions being symmetrically disposed about said laser beam, and with said directions thereby defining left and right speckle beams, and further, with said directions defining a plane that contains said laser beam.
    (c) redirecting the left speckle beam such that it interferes with the right speckle beam and thereby creating within each speckle feature a set of fringes having a varying intensity;
    (d) obtaining the amount of displacement of the object in the plane containing said left and right speckle beams by measuring the change in intensity of said fringes as the object is displaced.

2. The method of claim 1 wherein the step of redirecting is accomplished with optical fibers and integrated optical wavelength structures that serve as the optical path and beamsplitter, respectively.

3. In metrology, the method of measuring strain within an object with sub-wavelength accuracy in real-time by interfering speckle beams, comprising the steps of:

(a) irradiating a first spot on an object with a laser beam at normal incidence to obtain a first speckle, said first speckle comprised of random-appearing intensity distribution features;

(b) irradiating a second spot displaced from said first spot with a second laser beam, coherent with said first laser beam, at normal incidence to obtain a second speckle, said second speckle comprised of random-appearing intensity distribution features;

(c) collecting said first speckle using standard optics in a left and a right direction, said left and right directions being symmetrically disposed about said first laser beam, and with said directions thereby defining left and right speckle beams, and further, with said directions defining a plane that contains said first and second laser beams.

(d) collecting said second speckle as in step (c) wherein the left and right beams of said second speckle are at the same relative directions and lie within the same plane as the beams collected in step (c);

(e) redirecting the left speckle beam of the second speckle such that it interferes with the left beam of the first speckle and thereby creating a set of fringes having a varying intensity;

(f) redirecting the right beam of the first speckle such that it interferes with the right beam of the second speckle and thereby creating a set of fringes having a varying intensity;

(g) obtaining the amount of strain of the object in the plane containing the four speckle beams by measuring the difference in intensities of the two sets of fringes as the object is stressed.

4. The method of claim 3 wherein said steps of redirecting are accomplished with optical fibers and integrated optical wavelength structures that serve as the optical path and beamsplitter, respectively.

5. In metrology, a displacement measuring device for detecting the amount of displacement of an object with sub-wavelength resolution from the change in intensity of interfering speckle beams, comprising:

(a) a laser light source means for irradiating the object to obtain speckle;

(b) means for collecting beams of scattered light in a left and a right direction, said left and right directions being symmetrically disposed, and with said directions thereby defining left and right speckle beams;

(c) means to cause amplitude interference between said left and right beams, thereby creating within a speckle feature a set of fringes having a varying intensity;

(d) means to monitor change in intensity of said fringes from which displacement of the object can be obtained.

6. In metrology, the method of measuring displacement and deformation of an object with sub-wavelength accuracy in near real-time by interfering speckle beams, comprising the steps of:

(a) irradiating a first spot on an object with a first laser beam at normal incidence to obtain a first speckle, said first speckle comprised of random amplitude and phase distribution;

(b) irradiating a number of additional spots on said object with a number of additional laser beams, all of said additional laser beams being coherent with said first laser beam, such that each laser beam results in an additional speckle and with each of said spots falling on a straight line;

(c) collecting said speckle by standard optical means so as to cause pairwise interference between said speckle, said optical means arranged to ascertain specific features of displacement and deformation as desired.

* * * * *